United States Patent
Willcock et al.

(10) Patent No.: US 12,131,255 B2
(45) Date of Patent: *Oct. 29, 2024

(54) DYNAMIC MINIBATCH SIZES

(71) Applicant: Google LLC, Mountain View, CA (US)

(72) Inventors: Jeremiah Willcock, Santa Clara, CA (US); George Kurian, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 989 days.

This patent is subject to a terminal disclaimer.

(21) Appl. No.: 17/034,338

(22) Filed: Sep. 28, 2020

(65) Prior Publication Data

US 2021/0019570 A1  Jan. 21, 2021

Related U.S. Application Data

(63) Continuation of application No. 16/246,371, filed on Jan. 11, 2019, now Pat. No. 10,789,510.

(51) Int. Cl.
*G06N 3/08* (2023.01)
*G06F 16/901* (2019.01)
(Continued)

(52) U.S. Cl.
CPC .......... *G06N 3/08* (2013.01); *G06F 16/9017* (2019.01); *G06F 18/213* (2023.01); *G06F 18/2148* (2023.01); *G06N 3/084* (2013.01)

(58) Field of Classification Search
CPC ................................. G06N 3/084; G06N 3/08
See application file for complete search history.

(56) References Cited

U.S. PATENT DOCUMENTS 8,904,149 B2  12/2014  Eren et al.
2012/0239688 A1  9/2012  Yanase
(Continued)

FOREIGN PATENT DOCUMENTS

CN  107278310  10/2017
TW  201701199  1/2017
(Continued)

OTHER PUBLICATIONS

Keuper et al, "Distributed Training of Deep Neural Networks: Theoretical and Practical Limits of Parallel Scalability" 2016, arXiv.org, https://arxiv.org/abs/1609.06870 (Year: 2016).*
(Continued)

*Primary Examiner* — James D. Rutten
(74) *Attorney, Agent, or Firm* — Fish & Richardson P.C.

(57) ABSTRACT

Methods, systems, and apparatus, including computer programs encoded on computer storage media, for using dynamic minibatch sizes during neural network training. One of the methods includes receiving, by each of a plurality of host computer, a respective batch of training examples, each training example having zero or more features, computing, by each host computer, a minimum number of minibatches into which the host computer can divide the respective batch of training examples so that the host computer can process each minibatch using an embedding layer of the neural network without exceeding available computing resources, determining a largest minimum number of minibatches (N) into which any host computer can divide its respective batch of training examples, generating, by each host computer, N minibatches from the respective batch of training examples received by the host computer, and processing, by each host computer, the N minibatches using the embedding layer.

20 Claims, 3 Drawing Sheets

(51) Int. Cl.
*G06F 18/213* (2023.01)
*G06F 18/214* (2023.01)
*G06N 3/084* (2023.01)

(56) References Cited

U.S. PATENT DOCUMENTS

| | | | |
|---|---|---|---|
| 2015/0220833 | A1 | 8/2015 | Le |
| 2017/0140021 | A1 | 5/2017 | Gopi |
| 2017/0300814 | A1 | 10/2017 | Shaked et al. |
| 2018/0032869 | A1 | 2/2018 | Tabaru |
| 2018/0196800 | A1* | 7/2018 | Volkovs .................. G06F 40/30 |
| 2018/0211164 | A1 | 7/2018 | Bazrafkan et al. |
| 2018/0357541 | A1 | 12/2018 | Chen et al. |
| 2019/0207650 | A1 | 7/2019 | Kearney |

FOREIGN PATENT DOCUMENTS

| | | |
|---|---|---|
| TW | I636404 | 9/2018 |
| WO | WO 2015175155 | 11/2015 |
| WO | WO 2016037351 | 3/2016 |

OTHER PUBLICATIONS

PCT International Preliminary Report on Patentability in International Application No. PCT/US2019/066626, dated Jul. 22, 2021, 13 pages.
CN Office Action in Chinese Application No. 201980058339.8, dated Sep. 28, 2021, 12 pages (with English translation).
TW Office Action in Taiwan Application No. 108148515, dated Oct. 19, 2020, 27 pages (with English translation).
Wang, Lei et al. "Distributed Parallel Processing Based on Master/Worker Model in Heterogeneous Computing Environment." Advances in information Sciences and Service Sciences, vol. 4 No. 2, pp. 49-57, (2012). (Year: 2012).
Chen et al., "Fast Distributed Deep Learning via Worker-adaptive Batch Sizing", Hong Kong University of Science and Technology, University of Toronto, Jun. 2018 (Year: 2018).
PCT International Search Report and Written Opinion in International Application No. PCT/US2019/066626, mailed Apr. 15, 2020, 20 pages.
Gu et al, A Parallel Computing Platform for Training Large Scale Neural Networks IEE International Conference on Big Data, 2013, 9 pages.
Kocmi et al, "An Exploration of Word Embedding Initialization in Deep-Learning Tasks" arXiv, 2017, 9 pages.
Stojanovski et al, "Twitter Sentiment Analysis using Deep Convolutional Neural Network" Research Gate, 2015, 13 pages.
Iandola et al, "FireCaffe: near-linear acceleration of deep neural network training on compute clusters" IEEE Conference on Computer Vision and Pattern Recognition, 2016, 9 pages.
Zou et al, "Distributed Training Large-Scale Deep Architectures" International Conference on Financial Cryptography and Data Security, 2017, 15 pages.
Moritz et al., "SparkNet" Training Deep Networks in Spark arXiv, 2016, 12 pages.
Ben-Nun et al., "Demystifying Parallel and Distributed Deep Learning" An In-Depth Concurrency Analysis arXiv, 2018, 47 pages.
Office Action in European Appln. No. 19839215.1, dated Mar. 2, 2023, 11 pages.

\* cited by examiner

DYNAMIC MINIBATCH SIZES

CROSS REFERENCE TO RELATED APPLICATIONS

This application is a continuation of U.S. application Ser. No. 16/246,371, filed Jan. 11, 2019, the contents of which are incorporated by reference herein.

BACKGROUND

This specification relates to artificial neural networks.

Neural networks are machine learning models that employ multiple layers of operations to predict one or more outputs from one or more inputs. Neural networks typically include one or more hidden layers situated between an input layer and an output layer. The output of each hidden layer is used as input to a next layer, e.g., the next hidden layer or the output layer.

Each layer of a neural network specifies one or more transformation operations to be performed on the inputs to the layer. Some neural network layers contain units that are referred to as neurons. Each neuron receives one or more inputs and generates an output that is received by other neural network layers. Often, each neuron receives inputs from one or more other neurons, and each neuron provides an output to one or more other neurons.

Each layer generates one or more outputs using the current values of a set of parameters for the layer. Training a neural network involves continually performing a forward pass on the input, computing gradient values, and updating the current values of the set of parameters for each layer. Once a neural network is trained, the final set of parameters can be used to make predictions.

Some neural networks have hidden layers that are embedding layers. Generally, embedding layers transform sparse neural network inputs, i.e., neural network inputs that have only a small number of features with non-zero values relative to the total number of features, into lower-dimensional vectors referred to as embeddings.

SUMMARY

This specification describes a distributed computing system that can process an embedding layer of a neural network during training of the neural network. The system includes host computers that each store a partition of a trainable embedding lookup table. To process a particular training example, a host computer obtains, for each feature of the training example, an embedding from a respective one of the partitions of the lookup table stored on a respective host computer. Obtaining an embedding involves sending a lookup request to the host computer that stores the partition of the lookup table to which the embedding belongs. After obtaining the embeddings for each feature, the host computer processes the embeddings to generate an embedding layer output for the training example.

The host computers process multiple training examples at a time. Specifically, each host computer receives a respective batch of training examples for processing during an iteration of training. Generally, each batch of training examples has the same number of training examples, and each training example has one or more features. Each host computer computes a minimum number of embedding minibatches into which the host computer can divide its batch of training examples so that the host computer can process each embedding minibatch using the embedding layer of the neural network without exceeding available computing resources on the host computer. In this specification, embedding minibatches will be referred to merely as "minibatches." The system determines the largest minimum number of minibatches (N) into which any host computer can divide its batch of training examples. Each host computer divides its batch of training examples into N minibatches and processes the N minibatches using the embedding layer of the neural network.

The distributed computing system operates under several constraints. First, each host computer must generally process the same number of minibatches as every other host computer. This is because (i) the host computers receive synchronous, parallel instructions and (ii) because the host computers have to exchange embeddings with each other during each iteration of training. Second, the host computers each have a limited amount of memory in which to store embeddings obtained from other host computers. More specifically, the host computers, which are special-purpose computers for processing neural networks, have only a small amount of scratchpad memory in which to store embeddings, as opposed to a large amount of main memory or cache as in traditional CPUs. Scratchpad memory is high-speed internal memory used for temporary storage of calculations, data, and other work in progress. Consequently, the number of embeddings that a host computer can obtain at one time is limited, which in turn limits the maximum minibatch size. Third, the number of features in each training example, and consequently, the amount of scratchpad memory required to store the embeddings for each training example, varies.

In light of these constraints, the subject matter of this specification can be implemented in particular embodiments so as to realize one or more of the following advantages. Dividing a batch of training examples into a large number of minibatches increases the number of times each host computer has to obtain embeddings from other host computers, which incurs avoidable read/write latency. On the other hand, dividing a batch of training examples into a small number of minibatches with a large number of training examples may be impossible due to available resources, e.g., scratchpad memory, on each host computer. The system described in this specification dynamically adjusts the number of minibatches before each iteration of training. Specifically, the system calculates the largest minimum number of minibatches (N) into which any host computer can divide its respective batch of training examples without exceeding available computing resources on any host computer. Each host computer then divides its batch of training examples into N minibatches. This process minimizes the number of minibatches into which each unique set of training examples is divided in each iteration of training. This, in turn, reduces the latency and overhead associated with each iteration of training, which reduces total training time and the amount of computational resources, e.g., processing power, consumed by the training process.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
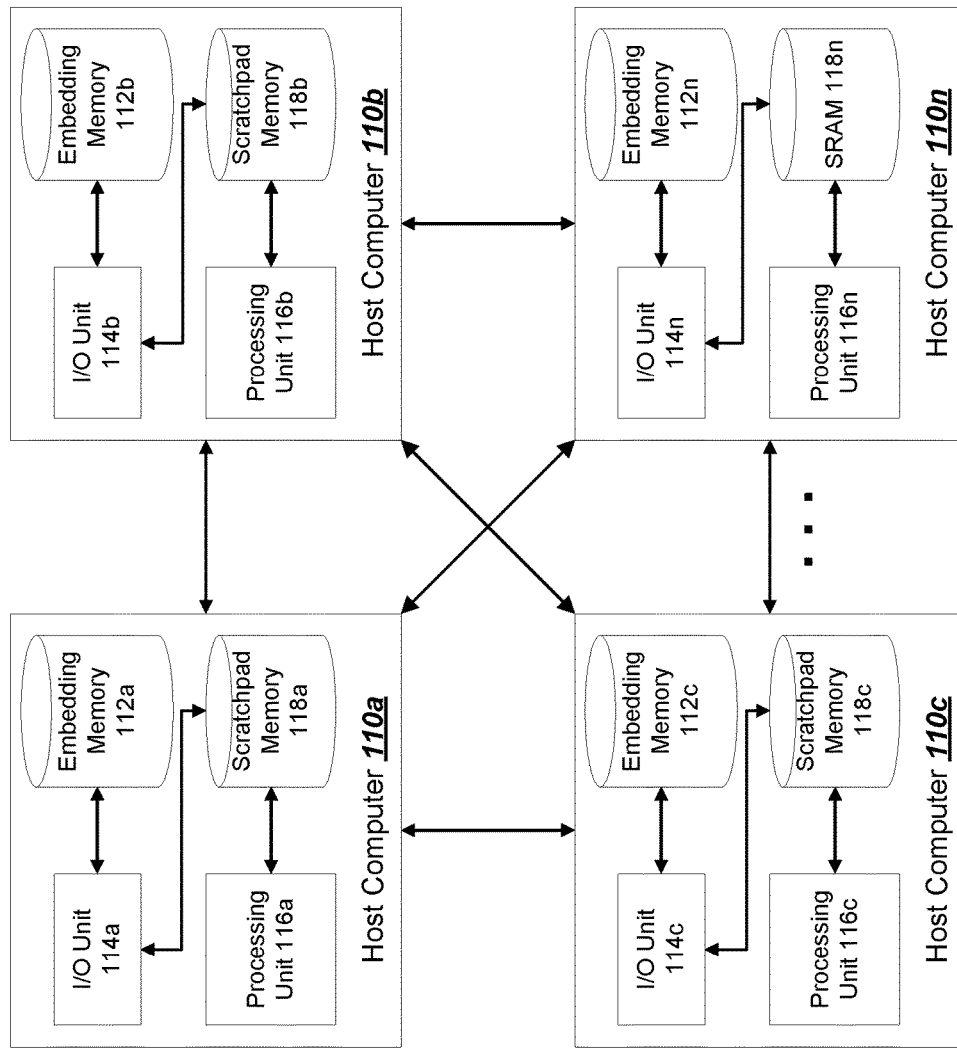
FIG. 1 is a diagram of an example distributed computing system.

FIG. 1 is a diagram of an example distributed computing system 100. The distributed computing system 100 is configured to process an embedding layer of a neural network.

This specification uses the term "configured to" in connection with systems, apparatus, and computer program components. For a system of one or more computers to be configured to perform particular operations or actions means that the system has installed on it software, firmware, hardware, or a combination of them that in operation cause the system to perform the operations or actions.

An embedding layer is a neural network layer that transforms sparse neural network inputs into embeddings. Embeddings are dense, multi-dimensional vector representations of inputs. Intuitively, the value of each dimension of a particular embedding encodes a different characteristic of the input that the embedding represents.

Generally, an embedding layer is trained by completing a forward pass through the entire neural network to which the embedding layer belongs, determining if there is a discrepancy between the actual output of the neural network and an expected output given the input, and updating the weights of the neural network, including the weights of the embedding layer, e.g., by using a conventional backpropagation technique or a similar technique known in the art. In other words, the embedding layer can be trained during the normal training process of the neural network.

An embedding layer can be reduced to a lookup table that stores an embedding for each potential feature of a neural network input. For example, if a particular neural network is configured to generate movie recommendations for users of a streaming service by modeling users' viewing histories, a lookup table for the neural network can store a separate embedding for every movie that is available on the streaming service. As another example, if a particular neural network is configured to generate search engine results based on a query written in English, a lookup table for the neural network can store a separate embedding for each word in the English language.

Each feature is represented by a different index, e.g., by a different integer. Features can be arranged by index in the lookup table. Processing an input using the embedding layer involves looking up, in the lookup table, the index for each feature in the input, retrieving the embedding at each index, and combining the embeddings, e.g., by adding the embeddings together. In a lookup table implementation of an embedding layer, training the embedding layer involves updating the values in the lookup table during the normal training process.

The distributed computing system 100 includes host computers 110a-110n. The host computers 110a-110n each store a partition of a lookup table of an embedding layer in embedding memories 112a-112n. The lookup table is distributed between the host computers because the number of input features and the number of dimensions in each feature are such that the entire lookup table would not fit in scratchpad memory on a single host computer. Additionally, obtaining embeddings from multiple host computers in parallel is faster than obtaining all embeddings from a single host computer. In some implementations, the embedding memories 112a-112n store partitions of multiple lookup tables, where each lookup table can store embeddings for a different type of feature. For example, referring again to the neural network that is configured to generate movie recommendations for users of a streaming service by modeling users' viewing histories, the neural network can additionally receive an input that specifies a user's genre preferences. A separate lookup table can store the genre embeddings.

During an iteration of training, each host computer in the distributed computing system 100 receives a batch of training examples. Each training example includes one or more features. To process a particular training example, a host computer obtains an embedding for each feature in the training example from one of the partitions of the lookup table, i.e., from one or more of the embedding memories 112a-112n. The host computers exchange embeddings using the input/output units 114a-114n. The input/output units are hardware components that include temporary register space and communication channels, e.g., buses, that connect the host computers to one another. The host computers store obtained embeddings and metadata about those embeddings, e.g., deduplication information and the number of embeddings in a training example, in scratchpad memories 118a-118n. The scratchpad memories 118a-118n are high-speed internal memories that are in close physical proximity to the processing units 116a-116n and are used for temporary storage of calculations and data. The scratchpad memories 118a-118n can be any appropriate memory structure, e.g., SRAM.

Using the individual embeddings, the host computers compute embedding layer outputs for their respective training examples using processing units 116a-116n. The processing units 116a-116n can include specialized hardware components to compute the embedding layer outputs. The host computers can include additional processing components that are not depicted in FIG. 1, e.g., a general-purpose CPU. These additional components can perform some or all of the techniques described in this specification for determining minibatch sizes.

Each host computer in the distributed computing system can provide embedding layer outputs to a system or subsystem that implements the remaining layers of the neural network. Such a system or subsystem can be implemented on the host computers or on separate physical hardware. Training proceeds as described above. Updating the embedding layer involves updating, by each host computer, the values in the partitions of the lookup table stored on the host computer based on gradients received from the other system or subsystem that implements the remaining layers of the neural network.

Because each host computer has a finite amount of scratchpad memory to store obtained embeddings, each host computer can obtain embeddings for only a limited number of training examples at one time. However, the amount of scratchpad memory that a training example uses varies depending on the number of features that the training example has. For example, referring again to a neural network that is configured to generate movie recommendations for users of a streaming service by modeling users' viewing histories, some users have a larger viewing history than others. A training example for a first user, for instance, may include several hundred features, i.e., movies, while a training example for a second user may include only several dozen features. Because the training example for the first user has more features, a host computer will have to obtain and store more embeddings for the first training example, and those embeddings will occupy more space in scratchpad memory. As another example, referring again to a neural network that is configured to generate search engine results based on queries written in English, some queries have more words than others. A host computer will have to obtain and store more embeddings for a query with more words, and those embeddings will occupy more space in scratchpad memory than would the embeddings for a query with fewer words. Additionally, the neural network can consider a user's query history, but the number of queries in a query history can vary from user to user. Query histories with a greater number of queries have more embeddings and thus take up more space in scratchpad memory. Conversely, some queries include repeated words. A host computer only needs to obtain a single copy of an embedding for any repeated word, so queries with repeated words will have fewer embeddings and thus take up less space in scratchpad memory. Similarly, two training examples in a single minibatch may have features in common. A host computer only needs to obtain a single copy of the embedding for any features that are repeated between training examples.

In summary, the number of training examples that a host computer can process at one time varies greatly based on the nature of the training examples. Specifically, the more unique features that occur in a given set of training examples, the more embeddings that a host computer must obtain from the lookup tables. More embeddings take up more space in scratchpad memory than fewer embeddings. The distributed computing system described in this specification can optimize the number of training examples that the host computers process at one time, i.e., the size of each minibatch and consequently, the number of minibatches per batch of training examples. Specifically, each host computer receives a batch of training examples, divides the batch of training examples into an optimal number of minibatches N, and processes one minibatch at a time until it generates an embedding for each of the training examples. This method will be described in more detail in reference to FIG. 2.

Figure 2:
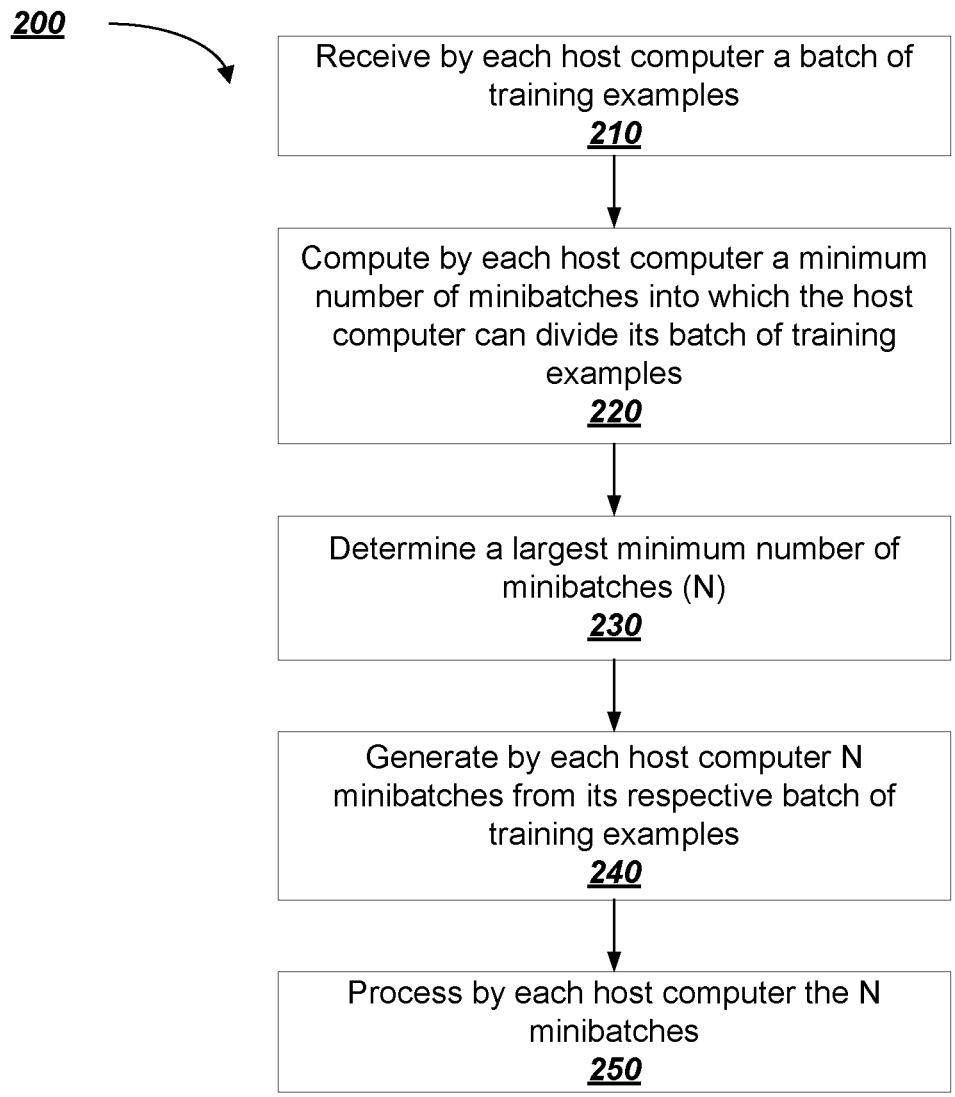
FIG. 2 is a flow chart of an example process for dividing batches of neural network training examples into minibatches.

FIG. 2 is a flow chart of an example process 200 for dividing a batch of neural network training examples into an appropriate number of minibatches. The example process 200 can be performed by the distributed computing system 100.

Each host computer in the system receives a respective batch of training examples for processing during an iteration of a training process for training a neural network (210). Each batch of training examples generally has the same number of training examples. Each training example has zero or more features. The number of features in each training example varies.

Each host computer computes a minimum number of minibatches into which it can divide the respective batch of training examples it receives so that it can process each minibatch using the embedding layer of the neural network without exceeding computing resources of the host computer (220). Generally, the host computer is limited by the amount of scratchpad memory, e.g., SRAM, on the host computer, because in order to process the training examples, the host computer obtains, for each feature in each training example, an embedding from a partition of the lookup table stored on one of the host computers of the distributed computing system. The host computer stores the obtained embeddings in scratchpad memory on the host computer in preparation for processing those embeddings.

Computing the minimum number of minibatches into which the host computer can divide its batch of training examples involves repeatedly, for values of M from an upper limit to a lower limit: (i) splitting the respective batch of training examples received by the host computer into M minibatches; and (ii) for each minibatch, determining if the embeddings corresponding to each input feature in each training example in the minibatch fit into scratchpad memory on the host computer.

The following pseudo-code illustrates this process:

```
start = 0
for i = 1 to len + 1:
    if i == len + 1 or minibatch[start ... i-1] does not fit in SRAM:
        if i == start + 1:
            return error
            //Single example does not fit
        else:
            output minibatch[start ... i-2]
            start = i - 1
```

In the pseudo-code, i is the training example index, and len is the total number of training examples in the batch of training examples. The first conditional statement tests whether a minibatch containing training examples 0 to i−1 fits into scratchpad memory on the host computer. If so, the host computer increments i. The host computer repeats this process until a minibatch containing training examples 0 to i−1 does not fit into scratchpad memory. If the last minibatch that does fit into scratchpad memory on the host computer has zero training examples, the host computer returns an error. Otherwise the host computer outputs the next largest minibatch that does fit into scratchpad memory, i.e., the minibatch containing training examples 0 to i−2. Suppose that i is equal to 7. This means that a minibatch containing training examples 0 to 5 fits into scratchpad memory, but that a minibatch containing training examples 0 to 6 does not. The host computer then sets the variable start to 6, and repeats this process for minibatches containing training examples 6 to i−1. The result of this iterative process is a number of minibatches that each fit into scratchpad memory on the host computer.

In some implementations, the above algorithm is modified to test non-sequential training examples. For example, although a minibatch containing training examples 0 to 6 may not fit into scratchpad memory on the host computer, a minibatch containing training examples 0 to 5 and 7 may. This is because, as mentioned above, the size of each training example varies. Modifying the algorithm in this way can, in some cases, reduce the number of resulting minibatches. The algorithm described above is merely illustrative, and other appropriate algorithms can be used.

Determining whether a particular set of training examples, i.e., a particular minibatch, fits into scratchpad memory on the host computer generally involves (i) computing an amount of scratchpad memory that each training example uses, e.g., by multiplying the number of features in each training example by the size of a feature, (ii) adding the results of step (i), and (iii) determining if the sum exceeds the total available scratchpad memory on the host computer. In computing the amount of scratchpad memory that a particular training example uses, the host computer considers any embeddings that were already accounted for, e.g., repeated embeddings from previous training examples.

The host computer also takes into account the amount of scratchpad memory it uses for processing, e.g., for executing the optimization algorithm described above.

Using the results computed in the previous step, the system determines the largest minimum number of minibatches (N) into which any of the host computers can divide its respective batch of training examples (230). In some implementations, one of the host computers is a designated master host, and the designated master host makes the determination. In such implementations, every other host computer sends its computed minimum number of minibatches to the designated master host, which determines a maximum among the minimums. The designated master host can rotate among the host computers for different iterations of the training process. This is advantageous because the system can compute the number of minibatches for multiple batches of training examples simultaneously. After computing N, the designated master host broadcasts the value N to all other host computers. In some other implementations, each host sends its computed minimum number to a separate component of the distributed computing system, which determines the maximum among the minimums. Other techniques for determining the largest minimum number of minibatches are also possible.

Each host computer divides the respective batch of training examples received by the host computer into N minibatches (240). In some implementations, when a host computer computes the minimum number of minibatches into which the host computer can divide the respective batch of training examples, it also divides the batch of training examples into that number of minibatches. In such implementations, dividing the respective batch of training examples into N minibatches involves re-dividing or subdividing the minibatches already present on that host computer into N minibatches. In some cases, N and the minimum number of minibatches for the host computer may be the same. In other cases, N may be greater than the minimum number of minibatches for the host computer. In such cases, the host computer can generate a minibatch with no training examples. In other implementations, the host computer can split one minibatch into multiple minibatches, which can involve splitting the minibatch into two minibatches with the same number of training examples. Other ways of splitting are possible.

Finally, each host computer process the N minibatches using the embedding layer of the neural network (250). Each host computer processes only one minibatch at a time. This process will be described in more detail in reference to FIG. 3.

Figure 3:
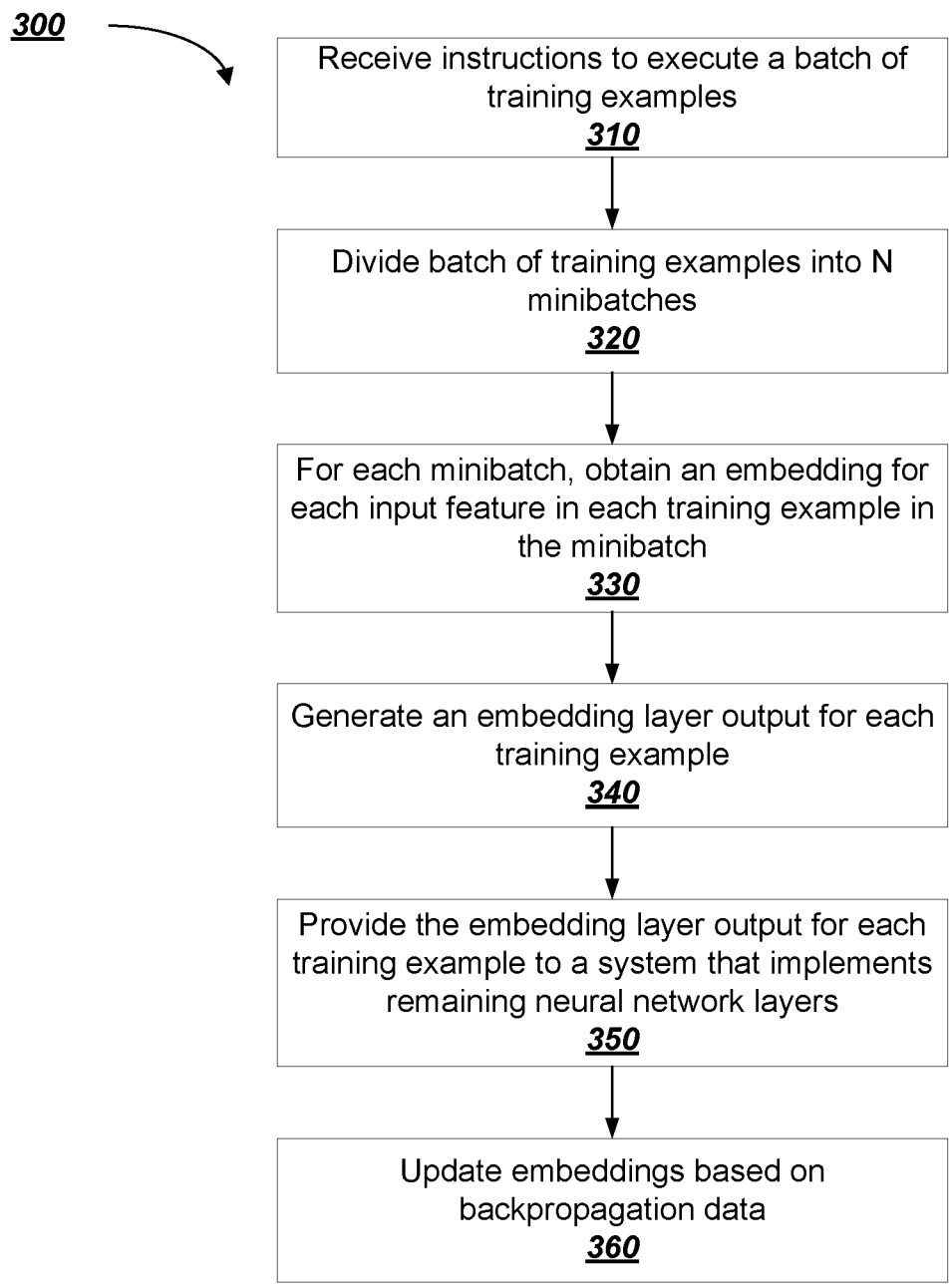
FIG. 3 is a flow chart of an example process for processing minibatches.

FIG. 3 is a flow chart of an example process 300 for processing minibatches. The process 300 can be performed by the distributed computing system 100.

The host computers of the distributed computing system each receive instructions to execute a batch of training examples (310). Generally, the number of training examples in each batch is the same, but the training examples in each batch are different.

The host computers perform the process described in reference to FIG. 2, i.e., each host computer divides its respective batches of training examples into N minibatches (320). The host computers process the minibatches in parallel. However, a particular host computer processes only one of its N minibatches at a time due to the previously described computing constraints.

Processing a minibatch by a host computer involves, for each input feature in each training example in the minibatch, obtaining an embedding corresponding to the input feature from a trainable lookup table (330). The trainable lookup table is distributed among the host computers, so obtaining the embeddings includes sending lookup requests to the other host computers. The lookup requests include the indices of the desired embeddings. The host computer stores the obtained embeddings in scratchpad memory on the host computer.

The host computer processes the embeddings to generate an embedding layer output for each training example (340). Generating an embedding layer output for a particular training example involves adding or concatenating the embeddings of each feature of the particular training example together. Specific techniques are described in greater detail in U.S. Pat. No. 9,898,441, which is incorporated herein by reference.

The host computers provide the embedding layer outputs for each training example to a system that is configured to implement the remaining layers of the neural network (350). Such a system can be implemented on the host computers or on separate physical hardware.

In some cases where the embeddings are being updated as part of a training process for training the neural network, the host computers receive backpropagation data from the other system. The host computers use the backpropagation data to update the embeddings that are stored in the distributed lookup table (360). Specifically, using the backpropagation data for the batch of training examples, each host computer can compute the gradient of the loss with respect to the current value of each dimension of each embedding that the host computer stores. To decrease the loss contribution of each dimension, the host computer can adjust the value of the dimension by a ratio of the gradient. This is known as stochastic gradient descent. Other appropriate methods known in the art can be used to update the embeddings. This completes an iteration of training. The example process 300 can also be used during inference to process batches of inputs by simply omitting step 360.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program (which may also be referred to or described as a program, software, a software application, an app, a module, a software module, a script, or code) can be written in any form of programming language, including compiled or interpreted languages, or declarative or procedural languages, and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and pointing device, e.g., a mouse, trackball, or a presence sensitive display or other surface by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone, running a messaging application, and receiving responsive messages from the user in return.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain some cases, multitasking and parallel processing may be advantageous.

What is claimed is:

1. A system comprising a plurality of host computers that are configured to process an embedding layer of a neural network during training of the neural network, wherein the system is configured to perform operations comprising:
   receiving, by each host computer, a respective batch of training examples for processing during an iteration of a training process for training the neural network, each training example having zero or more features, and wherein at least two different training examples in the respective batches received by the host computers have different numbers of features;
   computing, based on the numbers of features in each of the training examples in the respective batch received by the host computer, a minimum number of minibatches into which the host computer can divide the respective batch of training examples so that the host computer can process each minibatch using the embedding layer of the neural network without exceeding available computing resources on the host computer, wherein, at least two of the host computers compute different minimum numbers of minibatches as a result of the at least two different training examples having different numbers of features;
   determining, from the minimum numbers of minibatches, a largest minimum number of minibatches (N) among the computed minimum numbers of minibatches of each host computer;
   generating N minibatches from the respective batch of training examples received by the host computer; and
   processing, by each host computer, the N minibatches of training examples using the embedding layer of the neural network.

2. The system of claim 1, wherein processing a respective minibatch of training examples using the embedding layer of the neural network comprises:
   for each input feature in each training example in the minibatch, obtaining a vector corresponding to the input feature from a trainable lookup table; and
   for each training example, processing the obtained vectors to generate a vector representation.

3. The system of claim 2, wherein the trainable lookup table is distributed among the host computers.

4. The system of claim 3, wherein computing a minimum number of minibatches M into which the host computer can divide the respective batch of training examples comprises repeatedly, for values of M beginning at an upper limit:
   splitting the respective batch of training examples received by the host computer into M minibatches;
   for each of the M minibatches, determining if the vectors corresponding to each input feature in each training example in the minibatch fit into memory on the host computer; and
   until any of the M minibatches does not fit into memory on the host computer, decrementing M.

5. The system of claim 1, wherein the operations further comprise:
   dividing the respective batch of training examples received by the host computer into the computed minimum number of minibatches for the host computer; and
   re-dividing one minibatch into multiple minibatches if N is greater than the computed minimum number of minibatches for the host computer.

6. The system of claim 5, wherein splitting one minibatch into multiple minibatches comprises generating a minibatch with no training examples.

7. The system of claim 1, wherein one of the host computers is a designated master host, wherein the designated master host is configured to perform operations comprising:
   receiving, from each host computer, the minimum number of minibatches into which the host computer can divide the respective batch of training examples;
   determining the largest minimum number of minibatches (N) into which any host computer can divide its respective batch of training examples; and
   sending, to each host computer, data specifying N.

8. The system of claim 7, wherein the designated master host rotates among the plurality of host computers for different iterations of the training process.

9. A method performed by a plurality of host computers that are configured to process an embedding layer of a neural network during training of the neural network, the method comprising:
   receiving, by each host computer, a respective batch of training examples for processing during an iteration of a training process for training the neural network, each training example having zero or more features, and wherein at least two different training examples in the respective batches received by the host computers have different numbers of features;
   computing, based on the numbers of features in each of the training examples in the respective batch received by the host computer, a minimum number of minibatches into which the host computer can divide the respective batch of training examples so that the host computer can process each minibatch using the embedding layer of the neural network without exceeding available computing resources on the host computer, wherein, at least two of the host computers compute different minimum numbers of minibatches as a result of the at least two different training examples having different numbers of features;
   determining, from the minimum numbers of minibatches, a largest minimum number of minibatches (N) among the computed minimum numbers of minibatches of each host computer;
   generating N minibatches from the respective batch of training examples received by the host computer; and
   processing, by each host computer, the N minibatches of training examples using the embedding layer of the neural network.

10. The method of claim 9, wherein processing a respective minibatch of training examples using the embedding layer of the neural network comprises:
    for each input feature in each training example in the minibatch, obtaining a vector corresponding to the input feature from a trainable lookup table; and
    for each training example, processing the obtained vectors to generate a vector representation.

11. The method of claim 10, wherein the trainable lookup table is distributed among the host computers.

12. The method of claim 11, wherein computing a minimum number of minibatches M into which the host computer can divide the respective batch of training examples comprises repeatedly, for values of M beginning at an upper limit:
    splitting the respective batch of training examples received by the host computer into M minibatches;
    for each of the M minibatches, determining if the vectors corresponding to each input feature in each training example in the minibatch fit into memory on the host computer; and until any of the M minibatches does not fit into memory on the host computer, decrementing M.

13. The method of claim 9, further comprising:
dividing the respective batch of training examples received by the host computer into the computed minimum number of minibatches for the host computer; and
re-dividing one minibatch into multiple minibatches if N is greater than the computed minimum number of minibatches for the host computer.

14. The method of claim 13, wherein splitting one minibatch into multiple minibatches comprises generating a minibatch with no training examples.

15. The method of claim 9, wherein one of the host computers is a designated master host, wherein the designated master host is configured to perform operations comprising:
receiving, from each host computer, the minimum number of minibatches into which the host computer can divide the respective batch of training examples;
determining the largest minimum number of minibatches (N) into which any host computer can divide its respective batch of training examples; and
sending, to each host computer, data specifying N.

16. The method of claim 15, wherein the designated master host rotates among the plurality of host computers for different iterations of the training process.

17. One or more non-transitory computer-readable storage media storing instructions that, when executed by processor of a system comprising a plurality of host computers that are configured to process an embedding layer of a neural network during training of the neural network, cause the system to perform operations comprising:
receiving, by each host computer, a respective batch of training examples for processing during an iteration of a training process for training the neural network, each training example having zero or more features, and wherein at least two different training examples in the respective batches received by the host computers have different numbers of features;
computing, based on the numbers of features in each of the training examples in the respective batch received by the host computer, a minimum number of minibatches into which the host computer can divide the respective batch of training examples so that the host computer can process each minibatch using the embedding layer of the neural network without exceeding available computing resources on the host computer, wherein, at least two of the host computers compute different minimum numbers of minibatches as a result of the at least two different training examples having different numbers of features;
determining, from the minimum numbers of minibatches, a largest minimum number of minibatches (N) among the computed minimum numbers of minibatches of each host computer;
generating N minibatches from the respective batch of training examples received by the host computer; and
processing, by each host computer, the N minibatches of training examples using the embedding layer of the neural network.

18. The computer-readable storage media of claim 17, wherein processing a respective minibatch of training examples using the embedding layer of the neural network comprises:
for each input feature in each training example in the minibatch, obtaining a vector corresponding to the input feature from a trainable lookup table; and
for each training example, processing the obtained vectors to generate a vector representation.

19. The computer-readable storage media of claim 18, wherein the trainable lookup table is distributed among the host computers.

20. The computer-readable storage media of claim 19, wherein computing a minimum number of minibatches M into which the host computer can divide the respective batch of training examples comprises repeatedly, for values of M beginning at an upper limit:
splitting the respective batch of training examples received by the host computer into M minibatches;
for each of the M minibatches, determining if the vectors corresponding to each input feature in each training example in the minibatch fit into memory on the host computer; and
until any of the M minibatches does not fit into memory on the host computer, decrementing M.

* * * * *